Oct. 17, 1944.    J. W. SCANE    2,360,624
VEHICLE JACK
Filed Oct. 22, 1943    3 Sheets-Sheet 1
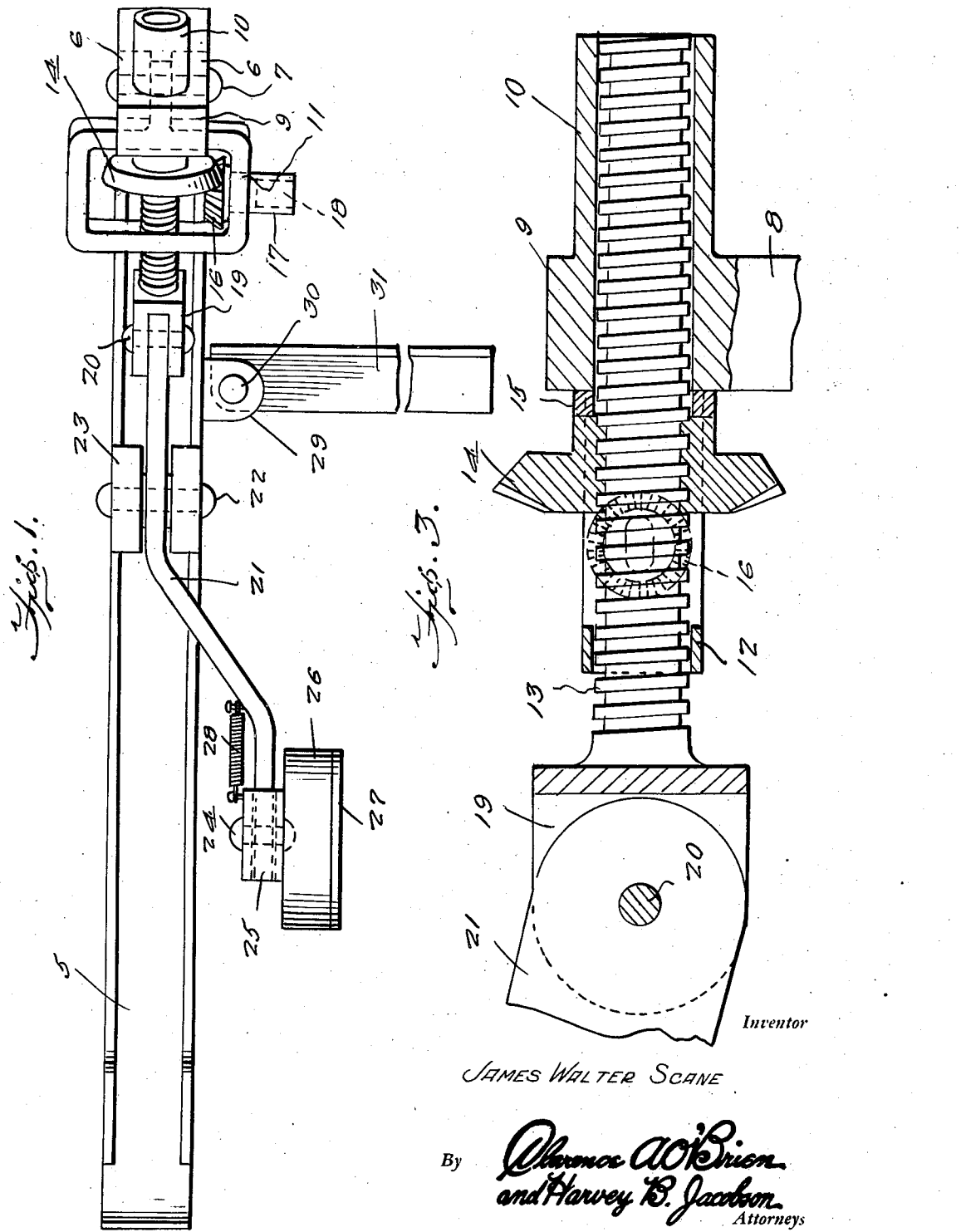
Inventor
JAMES WALTER SCANE
By *Clarence A. O'Brien and Harvey B. Jacobson*
Attorneys Oct. 17, 1944.  J. W. SCANE  2,360,624
VEHICLE JACK
Filed Oct. 22, 1943  3 Sheets-Sheet 2
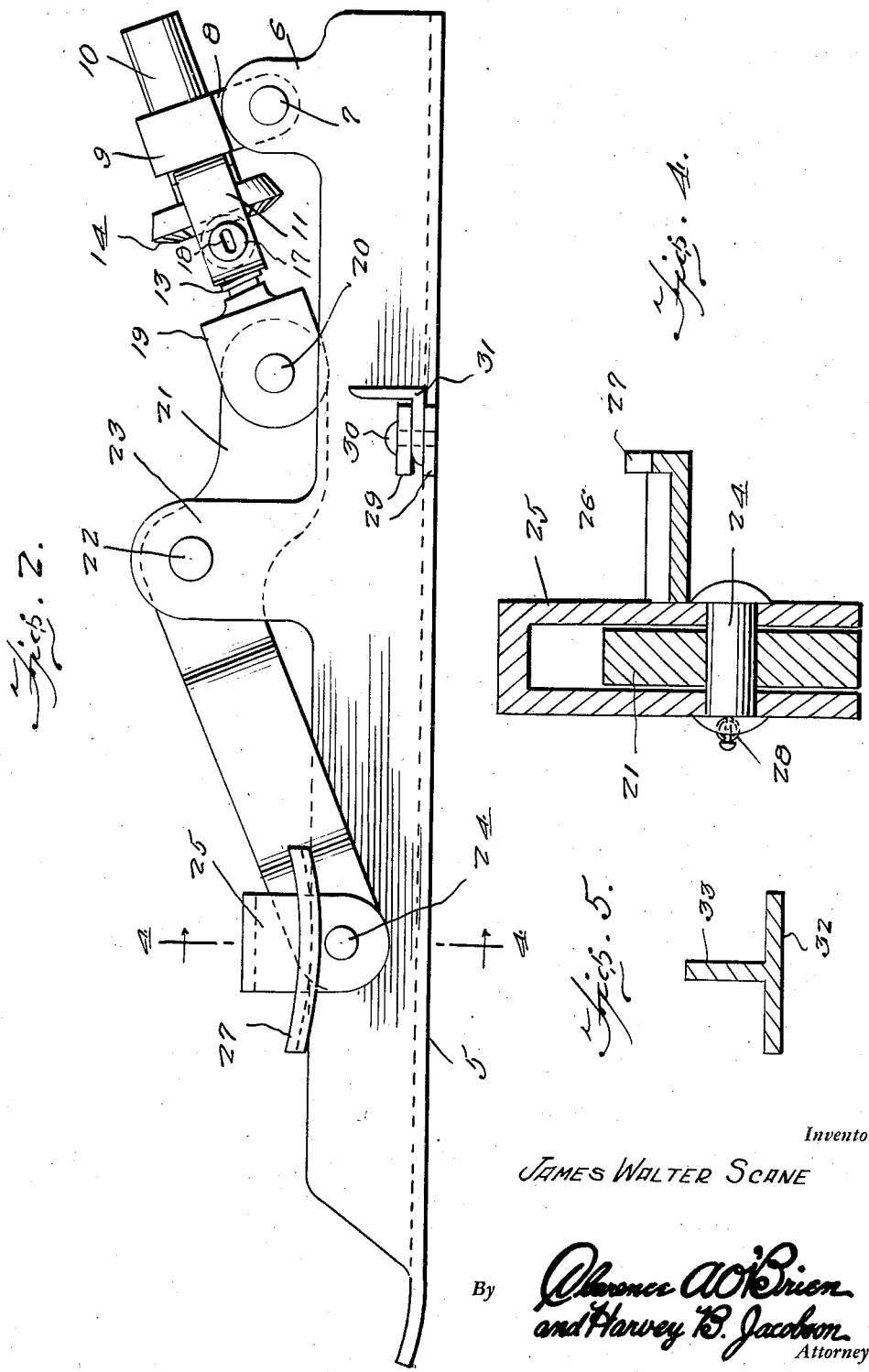
Inventor
JAMES WALTER SCANE
By Clarence A. O'Brien
and Harvey B. Jacobson
Attorneys

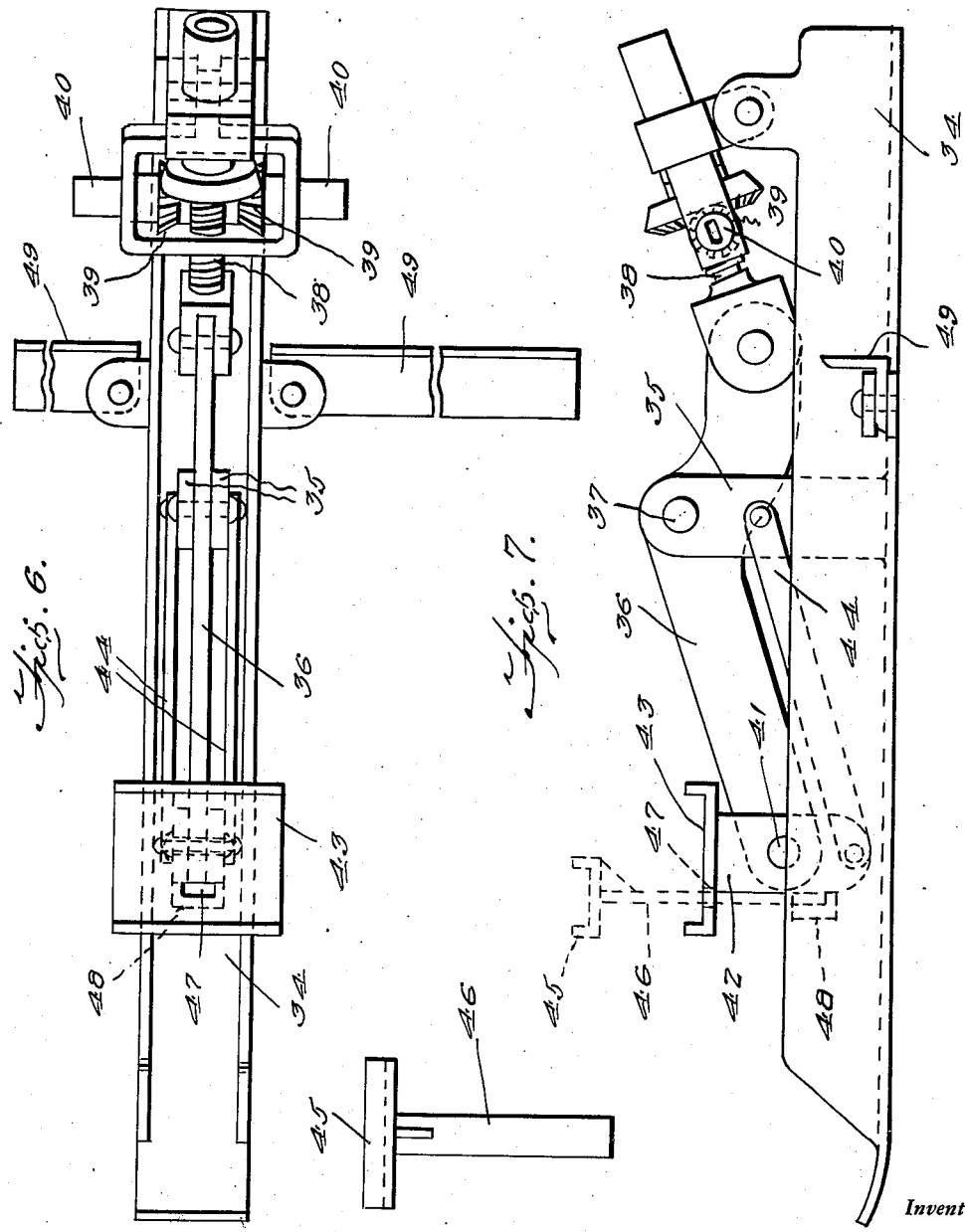

Patented Oct. 17, 1944

2,360,624

UNITED STATES PATENT OFFICE 2,360,624

VEHICLE JACK

James Walter Scane, Windsor, Ontario, Canada

Application October 22, 1943, Serial No. 507,326

4 Claims. (Cl. 254—126)

The present invention relates to new and useful improvements in vehicle jacks and has for its primary object to provide a jack adapted for engaging the brake drum of a vehicle wheel and embodying means for accurately centering the jack under the drum and which rigidly holds the vehicle in its elevated position against accidental displacement from the jack.

A further object is to provide a jack of this character of simple and practical construction, which is strong and durable, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view.

Figure 3 is a longitudinal sectional view through the screw guide.

Figure 4 is a sectional view taken on a line 4—4 of Figure 2.

Figure 5 is a transverse sectional view of a modified form of base.

Figure 6 is a top plan view of a modified jack construction.

Figure 7 is a side elevational view thereof, and

Figure 8 is a side elevational view of the detachable lift plate.

Referring now to the drawings in detail, the numeral 5 designates a channel base having a pair of ears 6—6 rising from the side edges of the base at one end thereof and between which is mounted a transverse pin 7 pivotally supporting a lug 8 projecting downwardly from a collar 9 having a sleeve 10 extending from one edge thereof. Formed on the opposite edge of the collar is a frame-like bracket 11 having an opening 12 in its outer side in alignment with the bore of the collar 9 and sleeve 10. A screw 13 is freely positioned in said opening and bore and is threadedly engaged with the internal threads of a gear 14 positioned within the confines of the bracket 11. A washer 15 is placed between the gear and the adjacent edge of the collar 9.

Also positioned within the confines of the bracket and engaging the gear 14 is a gear 16 having a shank 17 journaled in one side of the bracket, the shank having a socket 18 at its outer end for receiving a manipulating handle adapted to rotate the gears and to thus feed the screw longitudinally of the sleeve.

A yoke 19 is formed on one end of the screw having a transverse pin 20 to which the downwardly offset rear end of a lever 21 is pivotally attached. The intermediate portion of the lever is pivoted on a pin 22 extending transversely of a pair of ears 23—23 rising from the upper edges of the base 5.

The front end of the lever 21 is offset toward one side of the base and is provided with a transverse pin 24 on which an inverted U-shaped member 25 is pivotally mounted.

To one side of the member 25 is welded or otherwise suitably secured a lift plate 26 which is curved longitudinally and provided with an upstanding flange 27 at its outer edge, the plate being adapted to engage under a brake drum with the flange 27 engaged behind the usual flange of the dust shield of the drum to prevent slipping of the lift plate therefrom.

A coil spring 28 connects the member 25 with the lever 21 to yieldably maintain the lift plate in a horizontal position and to permit self adjusting of the plate when engaging the brake drum.

A pair of ears 29—29 project from one side of the base 5 having a vertical pin 30 and to which is pivotally attached a flanged arm 31 adapted to project laterally from the base at right angles thereto, or the arm may be swung inwardly against the side of the base 5.

In Figure 5, I have illustrated a modified base construction 32 having a single upstanding web or flange 33 and to which the several parts for operating the jack may be pivotally mounted.

In the operation of the jack, the base 5 is placed under the car alongside of the deflated tire and with the arm 31 disposed transversely of the tire and in engagement therewith. This position will center the plate 26 under the brake drum of the wheel and upon the operation of the gear 16 in a desired direction by a suitable handle, the gear 14 will move the screw 13 forwardly thereby forcing the rear end of the lever 21 downwardly and raising the front end of the lever and lift plate to elevate the wheel.

Figures 6–8 inclusive represent a modified jack construction and includes a base 34 of channel shape in cross section having a pair of posts 35 rising therefrom and between the upper end of which is pivoted the lift arm or lever 36 by means of the pin 37. The rear end of the arm is actuated as heretofore explained by the screw 38 except that a pair of operating gears 39—39 and sockets 40—40 are provided at opposite sides of the jack for operating the screw from either side.

The front end of the arm 36 is provided with a transverse pin 41 to which the intermediate portion of a leg 42 is pivoted, the upper end of the leg having a channeled lift plate 43 fixed thereon and adapted to receive the axle of the vehicle or other part thereof. A pair of brace rods 44—44 are pivoted at one end at opposite sides of the lower end of the leg 42 while the other ends of the rods are pivoted to the posts 35, the brace rods maintaining the lift plate in a horizontal position during raising and lowering of the arm 36.

An adapter lift plate 45 is also provided and has its leg portion 46 insertable through an opening 47 of the lift plate 43 into a socket 48 carried by the leg 42 of the lift plate 43, any desired number of the adapters being provided and of various heights to properly engage the part of the vehicle to be lifted under varying conditions.

A pair of the pivoted lateral arms 49—49 are also provided for engaging the deflated tire when the jack is used at either side thereof. The arms 31 and 49 facilitate location of the jack with respect to the part of the vehicle to be engaged by the lift plate, so that it is unnecessary to crawl under the car to check the location of the jack. By pivoting these arms, they may be compactly folded alongside the base when not in use. Also, the sleeve 10 and one of the arms 49 or arm 31 may be readily grasped to facilitate slipping of the jack into place by merely stooping slightly. In addition, the jack has great stability due to the long base, and it is quite practical to jack up a car on a considerable grade without setting the brakes or chocking the wheels, because this elongated base is adapted to lie directly on the ground substantially from end to end.

It is believed that the details of construction and manner of use of the device will be readily understood from the foregoing without further detailed explanation.

Having described the invention, what is claimed as new is:

1. A vehicle jack comprising a base adapted to lie on the ground alongside a wheel of the vehicle, a lever pivoted intermediate its ends to the base, screw means carried by the base and connected to one end of the lever to raise or lower the opposite end thereof, said last-named end of the lever being laterally offset beyond one side of the base, a member pivoted on the outer offset end of said lever, a lift plate pivotally carried by the member and having an upstanding flange on its outer edge adapted to engage behind the flange of a brake drum, and spring means connected to the member to yieldably maintain the lift plate in a predetermined position.

2. A vehicle jack comprising a channeled base adapted to lie on the ground along one side of a vehicle wheel, a collar pivoted on the base, a screw freely mounted in the collar, a bracket on the collar, an internally threaded gear on the screw, a manually operable gear carried by the bracket and engaged with the first-named gear, a lever pivoted intermediate its ends on the base and having one end pivoted to the screw for raising and lowering the other end of the lever, and a lift plate carried by said last-named end of the lever.

3. A vehicle jack comprising a base adapted to lie on the ground alongside a wheel of the vehicle, a lever pivoted intermediate its ends to the base, screw means carried by the base and connected to one end of the lever to raise or lower the opposite end thereof, a lift plate carried by the last-named end of the lever, and a rotatable operating member for said screw means located at one side of the base and mounted on an axis extending transversely of one end of the base.

4. A vehicle jack comprising an elongated base adapted to lie on the ground alongside a wheel of the vehicle, lifting mechanism mounted on the base including a lift plate, and arms carried by and extending laterally from opposite sides of the base and selectively engageable with the tire of the wheel at either side of the vehicle to facilitate location of the jack with respect to the part of the vehicle to be engaged by the lift plate.

JAMES WALTER SCANE.